(No Model.) 3 Sheets—Sheet 1.

G. D. VAN HOESEN.
WEIGHING AND PACKING MACHINE.

No. 447,385. Patented Mar. 3, 1891.

FIG. 1.

WITNESSES:
John Becker
Fred White

INVENTOR:
George D. Van Hoesen,
By his Attorneys,
Arthur G. Fraser & Co.

(No Model.)
3 Sheets—Sheet 2.

G. D. VAN HOESEN.
WEIGHING AND PACKING MACHINE.

No. 447,385. Patented Mar. 3, 1891.

FIG. 2.

WITNESSES:
John Becker
Fred White

INVENTOR:
George D. Van Hoesen,
By his Attorneys,
Arthur O. Fraser & Co (No Model.) 3 Sheets—Sheet 3.
G. D. VAN HOESEN.
WEIGHING AND PACKING MACHINE.

No. 447,385. Patented Mar. 3, 1891.

FIG. 3.

WITNESSES:
John Becker
Fred White

INVENTOR:
George D. Van Hoesen,
By his Attorneys,
Arthur C. Fraser & Co.

UNITED STATES PATENT OFFICE.

GEORGE D. VAN HOESEN, OF BROOKLYN, NEW YORK.

WEIGHING AND PACKING MACHINE.

SPECIFICATION forming part of Letters Patent No. 447,385, dated March 3, 1891.

Application filed April 3, 1890. Serial No. 346,385. (No model.)

*To all whom it may concern:*

Be it known that I, GEORGE D. VAN HOESEN, a citizen of the United States, residing at Brooklyn, in the county of Kings and State of New York, have invented certain new and useful Improvements in Weighing and Packing Machines, of which the following is a specification.

This invention relates to machines for weighing powder or other comminuted or granular substances and packing them in boxes, bags, or other receptacles.

The apparatus includes a hopper or other receiving-vessel for the substances to be weighed and packed, a weighing-scale, feeding apparatus for delivering the material from the hopper into the scale-pan, means actuated by the tilting of the scale-beam when the correct weight has been filled into the pan for arresting the feed, means for dumping the scale-pan, and a chute or conduit for conveying the dumped charge into the can or other packing-receptacle. Means are also provided for agitating the material so as to shake it down in the can. Provision is made for arresting the weighing apparatus and restarting the feed after the dumping of the scale-pan.

My present invention is to some extent a development of and improvement upon the machine shown in my patent, No. 249,210, dated November 8, 1881.

Figure 1:
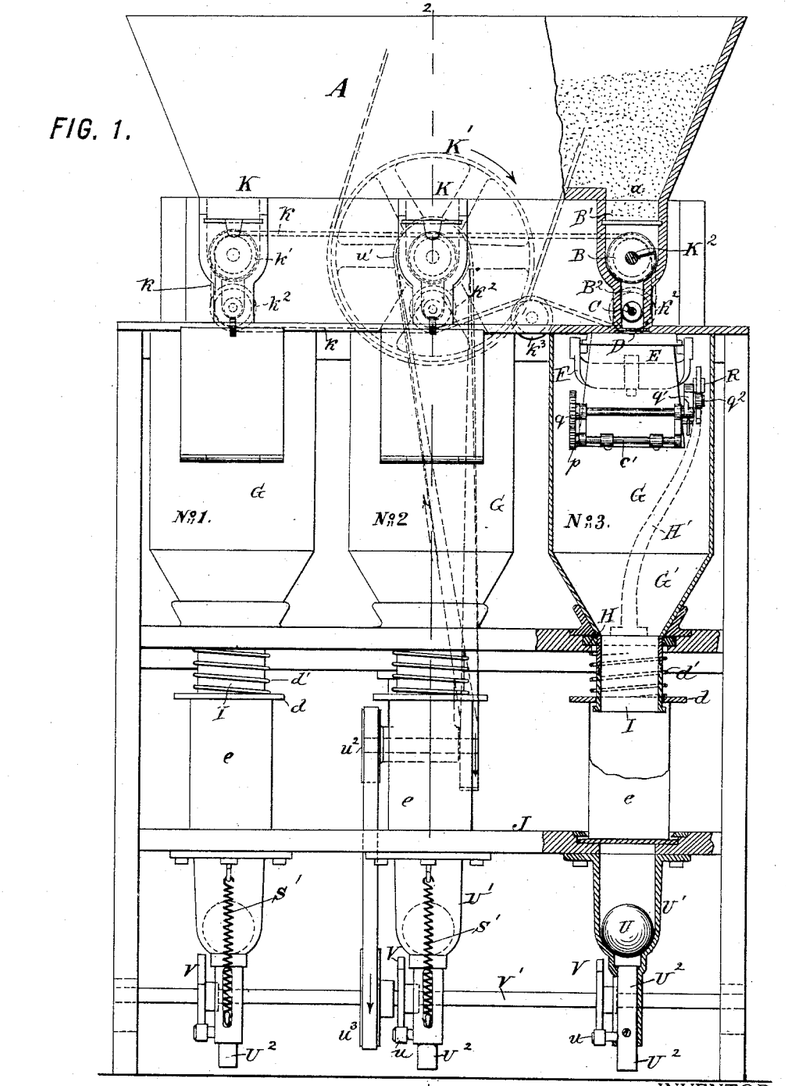
Figure 1 of the accompanying drawings is a front elevation of a construction of my present invention involving three sets of weighing apparatus, the right-hand apparatus being partly broken away in vertical section on the line 1 1 in Fig. 2.

Although in the machine shown in Fig. 1 there are combined three sets of weighing apparatus, all supplied from the same hopper, yet this arrangement is not essential to my invention. In practice I prefer to thus combine four such weighing apparatus operating in succession, as all four can be managed by one attendant, whose time is thereby most effectively utilized.

The essential parts of my invention, however, are embodied in a single apparatus, and I will therefore proceed to describe one of the three apparatus shown in Fig. 1, the others being of like construction.

At the top of the machine is a hopper or receiving-receptacle A, in which the powder or other substance to be packed is placed. Directly beneath the bottom outlet $a$ of this hopper is a horizontal passage or conduit B', in which turns a feed-screw or spiral conveyer B, which by its rotation moves the powder which falls into the conduit from the hopper toward the front. The conveyer B constitutes what I will hereinafter call the "major feed." In front of the conduit B' is a chamber B², which extends below the bottom of the conduit to a shelf or plate $b$, over which turns a smaller conveyer-screw C, which also rotates in such direction as to thrust the powder forward, as denoted by the arrow. In front of the bottom plate $b$ is an opening $b'$, closed at intervals by a slide D. The smaller screw C, taken in connection with this slide, constitutes what is hereinafter called the "minor feed." Directly beneath the opening $b'$ is the scale-pan E of the weighing-scale, which is hung, as usual, by knife-edges from the scale-beam F, this beam being fulcrumed and counterpoised in the usual way. The slide D being retracted so as to open the opening $b'$, the major feed-screw B is revolved and pushes the powder through the conduit B' and onto the screw C and over the latter and through the opening $b'$, so that it falls into the scale-pan. When the greater part of the desired quantity—say, for example, about four-fifths of the full weight—has been thus deposited in the pan, its weight depresses the pan, tilting the scale-beam, and thereby setting in action apparatus which will hereinafter be described and which arrests the rotation of the screw B. Thus far the minor screw C may have been revolving or not, but is preferably made to revolve continuously, and by the continuance of its revolution after the stoppage of the screw B it continues to feed to the scale-pan a small stream of powder, in order to fill the scale-pan slowly up to the full weight. The stream fed by the minor feed is at first and immediately upon the cessation of the major feed of considerable volume, by reason of the mass of material lying over the screw C, which mass is to a great extent shoved bodily by this screw and dumped into the scale-pan; but as this mass decreases the portion which is shoved over by the screw at each turn diminishes, so that the stream of powder entering the scale-pan becomes much attenuated as the full weight is reached. The purpose of this regulation of the stream is to insure the utmost nicety in the weighing operation, in order that the exact quantity desired may be weighed out and neither more nor less delivered into the scale-pan. As the powder is delivered by the minor feed the scale-pan slowly settles down, by reason of its increasing weight, until, when the scale-beam has been thereby tilted to the level indicative of the full weight in the scale-pan, mechanism hereinafter described is set in operation by which the slide D is instantaneously closed, thereby shutting off the feed. The scale-beam is now balanced with the exact weight desired in the scale-pan.

Figure 2:
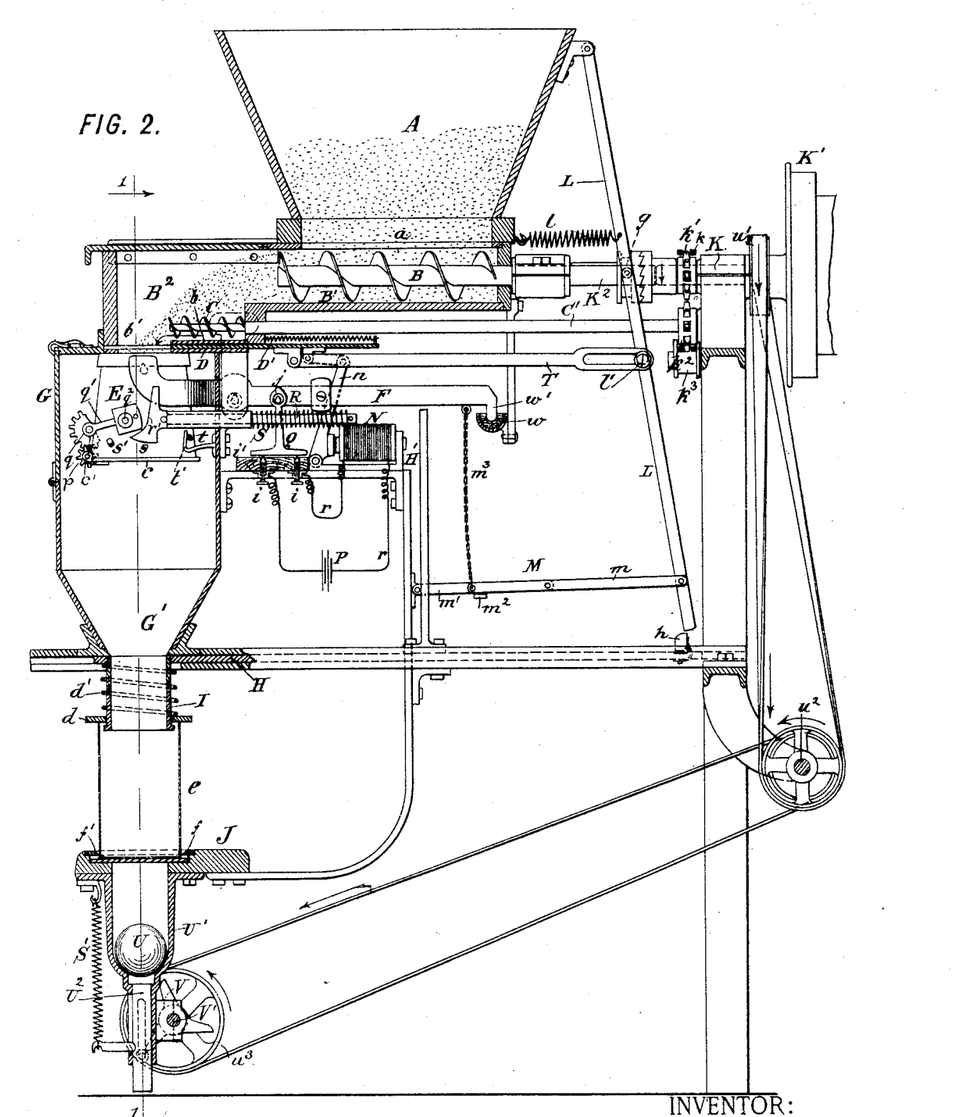
Fig. 2 is a side view in vertical section, taken on the line 2 2 in Fig. 1.
Figure 3:
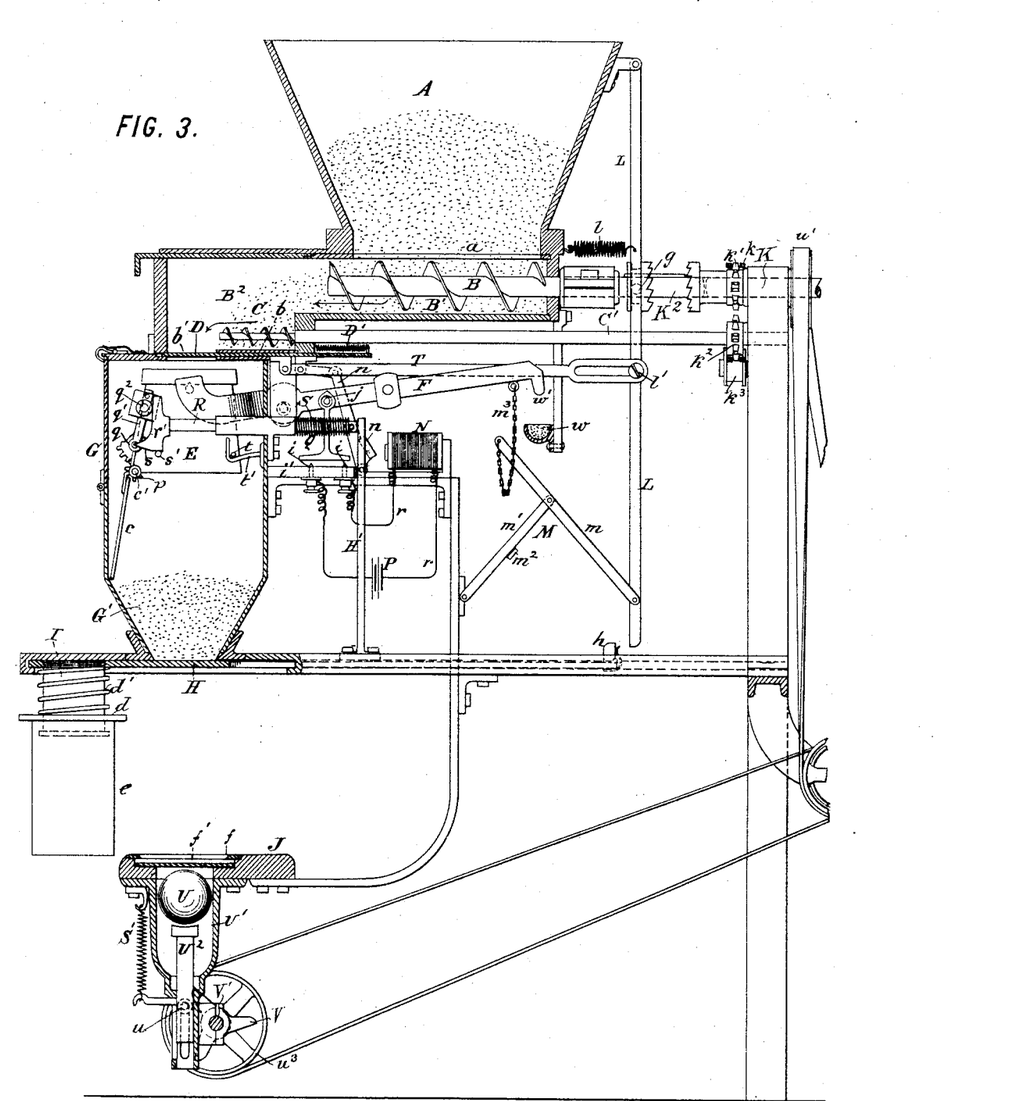
Fig. 3 is a similar section to Fig. 2, but showing the parts in a different position.

The scale-pan is inclosed in a casing G, the lower part of which is hopper-shaped, forming a receptacle G' for the measured charge of powder. Underneath this receptacle is mounted a slide H, which when pulled forward, as shown in Fig. 3, closes the receptacle. The act of pulling forward this slide dumps the scale-pan E by releasing its hinged bottom c, which falls down, as shown in Fig. 3, dumping the weighed charge into the hopper-shaped chamber G', where it rests on the slide H. The forward part of this slide carries a projecting tube or spout I, communicating with a hole in the slide. This spout is provided with a yielding flange or collar d, seated against the spring d'. The operator presses the can or other package to be filled (lettered e) up against this yielding flange, so that the lower end of the spout I enters it, and then by pushing backward slides back the sliding plate H until the axis of the spout I is brought into coincidence with that of the chamber G, as shown in Fig. 2. In this position the bottom of the can drops into a recess f on a table J and the can rests against a bottom plate f', being pressed down against it by a spring d'. This movement of the slide brings the spout-opening into coincidence with the bottom opening of the chamber G', so that the charge of powder therein falls through the spout into the can. The can is permitted to remain in this position while the next charge is being weighed out, and during that time the can is agitated by striking it a series of blows or raps, in order to shake down and compact the powder and bring the entire charge thereof from the spout down into the can and to level it at the top thereof, so that it shall not be liable to be spilled in removing the can. Finally the operator draws the slide forward again, first lifting the can e sufficiently to free it from the recess f, and upon carrying the can far enough forward to be clear of the table J it is moved downwardly and freed from the spout I. The act of pushing back the slide in order to bring the can to be filled under the chamber G' closes the bottom c of the scale-pan and fastens it in position for receiving the next charge, and immediately thereafter the slide D is pressed back to reopen the opening b' and permit the resumption of the feed, and simultaneously therewith or immediately succeeding it the major feed-screw B is again set to revolving, whereupon the feeding of the next succeeding charge commences, and the operation is in due course repeated.

The general operation of my apparatus and the construction of such parts thereof as act directly upon or are acted upon by the powder or other substance under treatment being now understood, I will proceed to describe the mechanism for imparting the various requisite movements to the several parts, remarking, however, that my invention is not necessarily limited to the particular mechanisms which I have devised for performing these functions.

The apparatus is driven by a shaft K through the medium of a belt-pulley K' or otherwise. The three shafts K K of the three apparatus shown in Fig. 1 are all driven synchronously together by means of a chain k, passing over sprocket-wheels k' on the shafts K K, as shown in Figs. 1 and 2. Beneath the shafts K K are three shafts C' C', on which the conveyer-screws C C are mounted, and these latter shafts are provided with sprocket-wheels $k^2$, engaged by the same chain k, whereby they also are driven at like speeds. Any slack in the chain is taken up by an idler sprocket-wheel $k^3$, as shown in Fig. 1, which is vertically adjustable.

The major feed-screw B is mounted on, or attached by, a coupling or otherwise to a shaft $K^2$, which is clutched to the driving-shaft K, which revolves continuously through the medium of a clutch g of any usual or suitable construction. In the construction shown one half of this clutch is fixed on the shaft K, while the other half slides on a spline on the shaft $K^2$, so that when its teeth are brought into engagement with those on the fixed half the two parts are driven together and rotation is imparted through the shaft $K^2$ to the propeller-screw B. The movable part of the clutch is formed, as usual, with a circumferential groove engaged by a pin on an operating-lever, this lever (lettered L) being pivoted at its upper end, drawn back by a retracting-spring l to release the clutch, and its lower end projecting down into proximity to the slide H, so as to be encountered by a dog or pawl h, carried by this slide. When the slide is pushed back, this pawl encounters the lower end of the lever L and forces it from the position shown in Fig. 3 back to that shown in Fig. 2, clearing it, however, by passing under it when it is fully moved to the latter position. This movement of the lever L engages the clutch g and rotates the major feed-screw B. The lever L is held in this position so as to keep the clutch engaged by means of a toggle-brace or pivoted strut M, consisting of two toggle-links $m$ and $m'$, pivoted, respectively, to the lever L and to a fixed part of the frame. The movement of the lever L to the position shown in Fig. 2 straightens out these toggle-links, bringing them into line with each other, so that they serve as a strut to resist the return movement of the lever. Their correct alignment is insured by the link $m$ striking a stop $m^2$ on the link $m'$. Either link or a prolonged end of either of them is connected by a chain or cord $m^3$ to the scale-beam F. This chain is of such length that it shall be tautened when the scale-beam is tilted to the position it assumes when the major portion of the charge of powder has been deposited in the scale-pan and it is desired to arrest the major feed. Being thus adjusted the descent of the scale-pan moving up the opposite end of the scale-beam causes the latter to pull on this chain, and thereby to deflect upwardly the toggle-links. As soon as this deflection commences the tension of the spring $l$, acting through the lever L, co-operates with the pull of the scale-beam and the toggle-links fly upward to the position shown in Fig. 3, the lever L being retracted by its spring $l$ and the clutch $g$ disengaged. The feeding of the material by the rotation of the screw B is thus arrested.

In my said former patent the arresting of this feeding-screw (which in that patent is the sole feed) is relied upon to discontinue the feeding of powder to the scale-pan when it has received the proper weight. This method, although it will answer well enough where no great nicety of weight is required, is not sufficiently prompt or accurate to be feasible where it is desired to weigh out the charges with great precision. I have therefore in my present invention relied upon this feed merely to transfer the greater portion of the charge to the scale-pan, leaving the nicer work of exact weighing to be done by what I term the "minor feed." To this minor feed is relegated the work of feeding in a restricted or preferably a diminishing stream the remaining portion of powder necessary to complete the full weight. When the full weight is completed, I do not rely upon the stoppage even of the minor feed-screw C, although this would be much more accurate in its operation than the stoppage of the major screw B; but I provide for cutting off the flow positively by the cut-off slide D. Preferably, and for the sake of simplicity, the minor screw C is made to revolve continuously, being driven by the chain $k$ from the driving-shaft K, which revolves continuously.

The slide D, by which the minor feed is interrupted, is provided with a retracting-spring D', tending constantly to close it, and during the feeding operation is held open by the attraction of an electro-magnet N, the armature of which is mounted on a lever $n$, which is connected to the slide by a link. As long as the magnet N is excited by an electric current traversing its coil it continues to attract its armature, and thereby holds the slide D open against the tension of its spring. Upon the breaking of the electric circuit of this magnet, however, it releases its armature and the spring D' is freed and enabled to close the slide, which it does by a quick movement, instantly arresting the flow. The coils of the magnet N are in an electric circuit $r$, fed by a battery P. The wires $r$ $r$ terminate in contact-points $i$ $i$, of metal, which project above the shelf or frame $i'$. A circuit-closer Q, consisting of a weight hung from the scale-beam by a loose connection, rests normally on these points, as shown in Fig. 2. This circuit-closer consists of a suitably-weighted plate resting simultaneously on both contact-points, so as to form a conducting-bridge between them to close the circuit, and hung by a vertical stem or link from a knife-edge on the scale-beam. The connection of this link with the knife-edge is a loose connection having sufficient lost motion, so that it is unaffected by any movement of the scale-beam from the highest position of the scale-pan down very nearly to the position assumed when the scale-pan receives its full weight. At the instant before this position is assumed the knife-edge $j$ on the scale-beam encounters the link, so that the weight of the circuit-closer Q is added to the poise on the scale-beam. The movement of the scale-beam is consequently arrested for an instant until sufficient additional powder has been added to the charge in the scale-pan to bring the latter up to full weight, whereupon the additional weight of the circuit-closer Q is overcome, and the further tilting of the scale-beam lifts the circuit-closer off from the contact-points $i$ $i$ and breaks the circuit, whereupon the slide D instantly closes, as described.

It might be supposed that the blow necessarily exerted by the scale-beam in order to trip the toggle-brace M, and thereby release the lever L, would impair the accuracy of the weighing operation. This, however, is not the fact, since, first, but a very slight pull is necessary to trip the toggles, and, secondly, even though this pull might be considerable, after the tripping of the toggles the scale-beam is again in equipoise, being relieved of this pull, and the final weighing is subsequently performed while the beam is thus in equipoise. For example, assuming that packages of one pound are to be weighed, the major feed may deliver fifteen ounces to the scale-pan before it is arrested. In this case the scale-beam will begin to tilt at, for example, fourteen and one-half ounces, and in tilting will exert a slight pull or drag against the chain $m^3$, so that before the fifteen ounces have been delivered it will have tripped the toggle, and the major feed-screw will then stop, the delay in stopping it being such as to approximately complete the fifteen ounces. The scale-beam will then continue slowly to tilt under the slowly-increasing weight in the scale-pan until its knife-edge $j$ encounters the link of the circuit-closer Q, which may have a weight sufficient to counteract, for example, one-half ounce on the scale-pan. The knife-edge then will encounter this circuit-closer link when the load in the scale-pan is about fifteen and one-half ounces, and at the instant it reaches almost sixteen ounces it will lift the circuit-closer, breaking the circuit and instantly shutting off the feed. Any other relative proportions, however, may be adopted.

I will now describe the means for dumping and releasing the scale-pan. Its bottom $c$ is hinged at one side, being mounted on a little spindle $c'$, having on one of its ends a pinion $p$, engaged by a toothed sector $q$, from the shaft of which projects a weighted arm $q'$, carrying an anti-friction roller $q^2$. When this arm extends horizontally, as shown in Fig. 2, and the bottom $c$ is closed, the weight of the arm $q'$ is sufficient to hold the bottom closed against the pressure of the superincumbent mass of powder which may be filled into the scale-pan. When the slide H is pulled forward after it has been moved far enough to close the bottom opening of the chamber G', an arm H', carried by it, encounters the end of a sliding bar R, which is normally pressed backward by a spring S, and slides this bar forward from the position shown in Fig. 2 to that shown in Fig. 3. In this movement a curved cam-surface or runner $r'$ on the front of the bar encounters the anti-friction roller $q^2$ and moves it first upwardly and then forwardly by reason of the configuration of the cam $r'$, throwing it over to the position shown in Fig. 3, and thereby opening the bottom $c$ and discharging the contents of the pan. To prevent the sudden reascent of the scale-pan upon being thus relieved of the weight, the front end or head of the bar R is formed on its under side with a cam-surface $s$, which engages a pin $s'$ on the scale-pan, and thus holds the scale-pan down. The thrust of the bar R against the roller $q^2$ would tilt the scale-beam unduly, but for the provision of a pin $t$ on the latter, which when the pan is very slightly tilted engages a hooked finger $t'$, which resists any further tilting. In the ordinary weighing this pin hangs out of contact with the finger. When the slide H is next pushed back, its arm H' releases the bar R, which is thrust back by its spring S, its cam $s$ permitting the slow ascent of the scale-pan while the retraction of its cam-face $r'$ permits the weighted arm $q'$ to fall again to its horizontal position, thereby reclosing the bottom $c$ and leaving the scale pan and beam in readiness for the next weighing operation.

To cushion the scale-beam and avoid shock when it returns to its initial position upon the ascent of the empty pan, I provide a cup $w$, partly filled with sand or other comminuted material, and on the scale-beam I provide a projection $w'$, which as the scale-beam reaches its initial or unloaded position enters the cup and embeds itself in the sand. The resistance of the bed of sand is such as to afford an ample cushion for the easing of any shock, thus permitting the scale-beam to settle easily into place. This simple device serves the same purpose as a dash-pot, with much less complication and expense and without in the least interfering with the free movement of the scale-beam during the act of weighing, at which time the projection $w'$ is lifted entirely out of the cup, as shown in Fig. 3.

The opening of the slide D may be effected in either of two ways. The release of the scale-pan by the bar R causes the tilting back of the scale-beam and drops the circuit-closer Q onto the contacts $i$ $i$, thereby restoring the electric circuit, and if the magnet N be made strong enough its attraction for its armature will pull the lever $n$, and through the latter will draw back the slide D. I prefer to make the magnet strong enough to accomplish this result, although it is not essential. Nevertheless I do not absolutely rely upon this operation of the magnet, since by preference I provide the slide also with a bar T, pivoted to the slide at one end and slotted on its other end to engage a pin $l'$ on the lever L, so that as this lever is thrust back to the position shown in Fig. 3 the pin will encounter the rear end of the slot and draw back the bar T with it, and through this bar will retract the slide. The slot in the bar is long enough to permit the pin $l'$ to travel freely through it upon the forward movement of the lever when released by the toggle-link. The pulling forward of the slide H by the attendant first closes the bottom of the chamber G', and, secondly, through the arm H' and bar R, causes the dumping of the scale-pan; thirdly, the scale-pan is held down during the entire time that the slide remains pulled forward; fourthly, upon pushing back the slide the retraction of the bar R gradually releases the scale-pan and restores it to its upper position, and, fifthly, recloses the scale-pan; sixthly, the restoring of the scale-beam recloses the electric circuit, while, seventhly, the final backward movement of the slide restores the lever L, thereby re-engaging the clutch $g$, and, eighthly, through the rod T reopens the slide D, while at the same time, ninthly, it discharges the charge of powder from the receiving-chamber G' into the can. During the forward movement of the slide the pawl $h$ yields in passing the end of the lever L.

The device for tapping or jarring the can to shake down and pack the powder consists, essentially, of a ball or weight U inclosed in a casing or frame U', mounted just beneath the table J and provided with a plunger $U^2$, with mechanism for reciprocating this plunger vertically in order to throw up the ball into contact with the table J, or preferably with the plate $f'$ thereof, on which the can rests. The plunger $U^2$ slides in vertical guideways formed in the lower part of the frame U'. A spring S' presses it upwardly, and it is drawn down at frequently-recurring intervals by the arms or wings on a cam V, which engage a roller $u$ on the plunger and press it down. This cam, in common with the like cams for that purpose in the gang, is mounted on a shaft V', Fig. 1, which is rotated from the main driving-shaft or either of the shafts K through the medium of a belt communicating motion from a pulley $u'$ on the driving-shaft to a similar pulley on a counter-shaft $u^2$, on which is another pulley belted to a pulley $u^3$, fixed on the shaft V'. Each plunger $U^2$ is thus pulled down by one of the arms of its cam V and instantly pressed back by its spring S'. The plunger is stopped by means of abutting shoulders before the ball encounters the plate $f'$, so that it throws the ball upwardly against this plate, giving the latter a jar, the intensity of which is determined by the weight of the ball and the tension of the spring S'. The ball is thus thrown against the plate $f'$ at short intervals during the entire running of the machine, or thrice to each revolution with the construction shown. As the can remains on the table J during the entire time that the subsequent weighing is being effected, it is submitted to this jarring operation long enough to thoroughly shake down and compact the charge of powder, conducting all the charge into the can.

By constructing the machines together in a gang, as shown best in Fig. 1, they may be operated in rapid succession and by the same attendant, whose time is thus fully utilized. For example, the attendant will first by pulling forward the slide withdraw the filled can from machine No. 1 and replacing it with an empty can will immediately push back the slide. The same operations will then be performed with machine No. 2, and then in succession with No. 3, and so on for as many as are combined in one gang. The number of machines thus combined should be such that by the time the operator has thus manipulated the last one the weighing operation in the first machine, No. 1, will have been completed, and this machine will be ready to be discharged and receive an empty can.

The table J or any part thereof, may be constructed to slide forward and back with the slide H, if desired.

In lieu of the electro-magnetic means for holding the slide D open and releasing it to cause it to close, any suitable mechanical means in the nature of a detent or other similar device, such as are already known in the art in analogous machines, may be substituted. The particular means for holding the clutch $g$ in engagement and for releasing it is not essential; and although I prefer the sensitive toggle-strut M, yet this may be substituted by other holding and releasing devices in the nature of detents, either of electromagnetic or mechanical order, both of which are well known in the art.

The part which I have called the "circuit-closer Q" should be considered as having two entirely distinct functions, the one that of a circuit closer and breaker, the other that of a separate weight or poise hung from the scale-pan through the medium of a loose connection having sufficient lost motion and provided with a stationary rest for upholding the poise when the arm of the scale-beam from which it is hung is depressed. The use of this poise enables the scale-beam to be utilized for performing mechanical work, such as the tripping of the toggle-strut M or other withholding and releasing mechanism, such work being done in advance of the final weighing operation and before the weight of the poise Q is sustained by the scale-beam, so that by subsequently adding the weight of this poise to the beam an additional quantity of powder to be weighed has to be fed into the scale-pan, and in effect a subsequent weighing operation is performed which is of greater nicety than the first, owing both to the scale-beam being poised without having any mechanical work to perform or other resistance to overcome, and in part to the slower rate at which the powder is being fed into the scale-pan at this time.

The most important, essential, and distinguishing feature of my invention resides in the successive employment of two feeds, the major and the minor feed, the former of which introduces the greater proportion of the charge to be weighed into the scale-pan, while the latter subsequently feeds through a much-reduced stream which becomes more attenuated as the final weight is approached, whereby the weighing operation is conducted not only with as great rapidity as heretofore when but one feed has been employed, but with much greater accuracy.

It is a characteristic feature of my invention that the weighing mechanism, although automatic in its operation, is put in action manually by the act of inserting the can to be filled, or by a mere reversal of the parts it might be by the act of removing the can. Thus the machine will adapt itself to the rapidity of the operator, and if no new can be supplied for a time the machine will remain inactive instead of continuing to uselessly weigh successive charges. The act of inserting the can sets the detents or trigger-like devices by which the feeding mechanisms are to be arrested to terminate the feed. These devices being thus set by the manual act of inserting the can are tripped or freed through the tilting of the scale-beam under the weight introduced into the scale-pan, and after being thus tripped the apparatus remains passive until the manual operation of removing the filled can.

My machine may be modified in many structural respects, and by the substitution of mechanical or electrical equivalents for any of the parts or mechanisms shown, without thereby necessarily altering its essential operation.

Such modifications will readily occur to those skilled in the mechanic arts, and I have not deemed it necessary to illustrate them.

I claim as my invention the following defined novel features and combinations, each substantially as hereinbefore specified, namely:

1. In a weighing-machine, the combination, with a scale, of a mechanical feeding apparatus driven from a source of power, and comprising a major and a minor feed for feeding, respectively, large and small streams to the scale-pan, means for arresting the major feed by the descent of the scale-beam under somewhat less than the full weight, and means for subsequently stopping the minor feed operated by the descent of the scale-beam under the exact full weight.

2. In a weighing-machine, the combination, with a scale, of a mechanical feeding apparatus comprising a major and a minor feed driven from a source of power, the major feed operating intermittently and delivering a large stream to the scale-pan and the minor feed operating after the arrest of the major feed and delivering a small stream, means for arresting the major feed by the descent of the scale-beam under somewhat less than the full weight, and means for subsequently cutting off the flow from the minor feed, operated by the descent of the scale-beam under the exact full weight.

3. In a weighing-machine, the combination, with a scale, of a mechanical feeding apparatus comprising a major and a minor feed driven from a source of power, for feeding respectively large and small streams to the scale-pan, means for arresting the major feed by the descent of the scale-beam under somewhat less than the full weight, a cut-off slide for terminating the flow from the minor feed, and means for closing said slide by the descent of the scale-beam under the exact full weight.

4. In a weighing-machine, the combination, with a scale, of a mechanical feeding apparatus consisting of a major and a minor feed driven from a source of power, for feeding respectively large and small streams to the scale-pan, means for arresting the major feed by the descent of the scale-beam under somewhat less than the full weight, the minor feed constructed after the arrest of the major feed to deliver to the scale-pan a stream having at first considerable volume, but diminishing as the full weight is approached into a much reduced or attenuated stream, and means for cutting off the minor feed, operated by the descent of the scale-beam under the full weight.

5. In a weighing-machine, the combination, with a scale, of a feeding apparatus comprising a major and a minor feed, the major feed constructed to discharge the material over the minor feed and into the scale-pan, whereby upon its arrest it leaves a mass of material to be operated upon by the minor feed, means for arresting the major feed by the descent of the scale-beam under somewhat less than the full weight, and means for subsequently cutting off the minor feed, operated by the descent of the scale-beam under full weight, whereby the minor feed, after the arrest of the major feed, delivers the accumulated material to the scale-pan in a stream of rapidly-diminishing volume.

6. In a weighing-machine, the combination, with a scale, of a feeding apparatus comprising a major feed consisting of a conduit and an intermittently-revolving conveyer-screw therein, a minor feed consisting of a revolving conveyer-screw, a clutch connecting the major feed-screw with a source of power, means for disengaging the clutch, operated by the descent of the scale-beam under somewhat less than the full weight, a slide for cutting off the feed from the minor screw, and means for closing this slide by the descent of the scale-beam under the full weight.

7. In a weighing-machine, the combination, with a scale, of a feeding apparatus comprising a major and a minor feed, the major feed consisting of a conduit and a conveyer-screw rotating therein, and a minor feed consisting of a conveyer-screw rotating in a chamber at the discharge end of said conduit, so that the material discharged from the major feed is forced onto and over the minor feed on its way to the scale-pan, means for arresting the major feed-screw by the descent of the scale-beam under somewhat less than the full weight, a cut-off slide for the minor feed, and means for closing this slide, operated by the descent of the scale-beam under the full weight.

8. In a weighing-machine, the combination, with a scale, of a feeding apparatus comprising a mechanical feed, a clutch for connecting it to a source of power, a lever for operating said clutch, a spring tending to move said clutch out of engagement, a detent device in connection with said lever for retaining the latter in position, consisting of toggle-arms arranged to act as a strut between said lever and a fixed part, and a connection between said toggle-arms and the scale-beam, whereby the tilting of the latter under the load in the scale-pan will trip the toggle-arms and enable them to be collapsed under the tension of said spring, whereby the lever is vibrated, the clutch is disconnected, and the feed is stopped.

9. In a weighing-machine, the combination, with a scale, of a feeding apparatus, means for arresting the feed by the descent of the scale-beam, a manually-operated part, as a slide, a dumping mechanism for emptying the scale-pan, operated by said slide, and means for setting the feed in operation again, adapted to be operated by a subsequent movement of said slide, whereby the re-establishment of the feed is under the control of the operator after he has caused the weighed charge to be dumped.

10. In a weighing-machine, the combination, with a scale, of a feeding apparatus for feeding a stream to the scale-pan, a cut-off slide for interrupting the feed, means operated by the descent of the scale-beam for closing said slide, a manually-operated part, as a slide, a dumping mechanism for emptying the scale-pan, operated by said manually-operated part, and means for subsequently reopening said cut-off slide and re-establishing the feed, operated by a subsequent movement of said manually-operated part.

11. In a weighing-machine, the combination, with a scale, of a feeding apparatus comprising a conveyer-screw, a clutch for connecting it to a source of power, a spring-pressed lever for operating said clutch, tending to disengage it, a restraining device in the nature of a detent for withholding said lever, means for releasing said device, operated by the descent of the scale-beam, and a manually-operated part, as a slide, constructed to engage and restore said clutch-lever and thereby to re-engage the clutch and re-establish the feed.

12. In a weighing-machine, the combination, with a scale, of a feeding apparatus comprising a cut-off slide for stopping the feed, a spring tending to close said slide, a restraining device for holding said slide open, means operated by the descent of the scale-beam for releasing said restraining device, a manually-operated part, as a slide, and a mechanical connection between said part and the cut-off slide adapted to reopen the latter and re-engage it with its restraining device.

13. In a weighing-machine, the combination, with a scale, of a feeding apparatus, a receiving-chamber arranged to receive the weighed charge dumped from the scale-pan, a manually-operated slide for closing the bottom of said chamber, and means constructed to be operated upon the operation of said slide adapted to set the feed into operation upon the movement of the slide to discharge the material from said chamber, whereby the new charge cannot be weighed and dumped until the charge already weighed has been discharged from said chamber.

14. In a weighing-machine, the combination, with a scale, of a feeding apparatus, means for automatically cutting off the feed when the full weight has been fed into the scale-pan, a dumping apparatus for dumping the scale-pan, a receiving-chamber arranged to receive the weighed charge dumped from the pan, and a slide for closing the bottom of said chamber, having an opening adapted to register therewith to receive beneath it the can or receptacle to be filled, whereby when the can is placed to receive the charge and the slide moved to bring said opening into register with the bottom opening of the chamber the weighed charge is discharged through said opening into the receptacle.

15. In a weighing-machine, the combination, with a scale, a feeding apparatus, and means for stopping the feed when the full weight has been deposited in the scale-pan, of a dumping apparatus for dumping the scale-pan, a chamber for receiving the charge dumped from the pan, and means for closing the discharge-opening of said chamber in mechanical connection with said dumping apparatus, whereby the closing of said opening is effected before the dumping of the scale-pan.

16. In a weighing-machine, the combination, with a scale, a feeding apparatus, and means for automatically arresting the feed, of a dumping apparatus for dumping the scale-pan, a receiving-chamber for receiving the charge dumped from the pan, and a manually-operated moving part or slide constructed when moved in one direction to dump the scale-pan and when moved in the opposite direction to restore the scale-pan and restart the feeding apparatus.

17. In a weighing-machine, the combination, with an automatic weighing apparatus consisting of a scale, a feeding apparatus, and means for stopping the feed upon the filling of the scale-pan to a predetermined weight, of a receiving-chamber for receiving the charge dumped from the scale-pan, a dumping apparatus for dumping the pan, and a manually-operated part or slide adapted when moved in one direction to operate the dumping apparatus to dump the scale-pan and when moved in the opposite direction to operate said apparatus to restore the scale-pan ready for receiving the next charge, and subsequently to restart the feed.

18. In a weighing-machine, the combination, with a scale, of a feeding apparatus, means for controlling the feed, tending to act to stop the feed, a restraining device for restraining said means, connected to the scale-beam to be operated by the descent thereof under a predetermined weight, and thereby to stop the feed when said weight is attained, a manually-operated moving part or slide, a dumping apparatus constructed to be operated thereby for dumping the scale-pan, and said moving part constructed to subsequently operate said feed-controlling device to start the feed and to re-engage it with the restraining device.

19. In a weighing-machine, the combination, with automatic weighing apparatus comprising a scale beam and pan, the latter having a pivoted bottom, and a counter-weight acting normally to hold said bottom closed against the weight of the material in the scale-pan, of a dumping apparatus consisting of a pusher adapted to engage some part in connection with said pivoted bottom and by its movement to lift the weight and open the bottom.

20. In a weighing-machine, the combination, with an automatic weighing apparatus comprising a scale beam and pan, the latter constructed with a pivoted bottom, a counter-weighted lever geared to said bottom and adapted to hold the latter closed against the weight in the scale-pan, of a dumping apparatus consisting of a pusher having a cam-surface adapted to engage said weighted arm and lift the latter, thereby opening the bottom.

21. In a weighing-machine, the combination, with automatic weighing apparatus comprising a scale beam and pan, the latter having a pivoted and counterweighted bottom, of a dumping apparatus consisting of a pusher adapted when thrust laterally to lift the counter-weight and open the bottom, and means for limiting the lateral displacement of the scale-pan, consisting of a stop $t$ on the pan, adapted to be displaced into contact with and be arrested by a fixed lateral stop $t'$ in substantially the manner specified.

22. In a weighing-machine, the combination, with automatic weighing apparatus comprising a scale beam and pan, the latter constructed with a pivoted and counterweighted bottom, of a dumping apparatus consisting of a pusher constructed when thrust laterally to lift the counter-weight and open the bottom, and means for preventing the immediate ascent of the scale-pan on being relieved of the weight of its charge, consisting of a stop projection in connection with the scale-pan and a cam-surface in connection with the pusher, adapted to engage said stop-projection upon the tilting of the pan and inclined to permit the ascent thereof as the pusher is retracted.

23. In a weighing-machine, the combination, with the scale-beam and the dumping scale-pan, of means for cushioning the return movement of the scale-beam, consisting of a projection on the beam and a cup containing sand or equivalent comminuted material arranged to be entered by it to cushion said projection.

24. In a weighing-machine, the combination, with automatic weighing apparatus, of a receiving-chamber $G'$ for receiving a charge dumped from the scale-pan, a slide H for closing the discharge-opening thereof, a spout I, communicating with the opening in said slide, a movable dust-collar $d$ on said spout, adapted to fit against the top of the can, and a spring $d'$ for pressing down said collar.

25. In a weighing-machine, the combination, with automatic weighing apparatus, of a receiving-chamber $G'$ for receiving the charge dumped from the scale-pan, a spout I, through which the charge is discharged into the receptacle, a table J beneath for upholding the receptacle, a spring for pressing the receptacle down against said table, and a jarring device in connection with said table for jarring or rapping the receptacle to pack the charge and facilitate its descent through the spout into the receptacle.

26. In a weighing and packing machine, the combination, with a table for holding the can in position to receive the weighed charge, of a jarring device consisting of a ball, a thrower for throwing the ball so that it shall strike a blow or jar to be imparted to the can, and a cam for imparting motion to said thrower.

In witness whereof I have hereunto signed my name in the presence of two subscribing witnesses.

GEORGE D. VAN HOESEN.

Witnesses:
GEORGE H. FRASER,
CHARLES K. FRASER.